(12) United States Patent
Smith et al.

(10) Patent No.: US 11,675,521 B2
(45) Date of Patent: Jun. 13, 2023

(54) COMPREHENSIVE DATA PROTECTION BACKUP

(71) Applicant: International Business Machines Corporation, Armonk, NY (US)

(72) Inventors: James Patrick Smith, Redwood City, CA (US); Austen M. Cook, Austin, TX (US); Thomas Franklin Ramke, Jr., Vonore, TN (US); Jason Ferris Basler, Los Gatos, CA (US); David George Derk, Gibsonia, PA (US); Lisa Anne Huston, Rochester, MN (US); Edward M. Collins, Tucson, AZ (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/407,141

(22) Filed: Aug. 19, 2021

(65) Prior Publication Data

US 2023/0056105 A1    Feb. 23, 2023

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS

| | | | |
|---|---|---|---|
| 10,067,836 B1 | 9/2018 | Chopra | |
| 10,298,680 B1* | 5/2019 | Thomas | H04L 43/0817 |
| 10,621,048 B1 | 4/2020 | Mudgal | |
| 10,671,316 B2 | 6/2020 | Allen | |
| 2008/0244601 A1* | 10/2008 | Zeis | G06F 11/1458 |
| | | | 714/E11.197 |
| 2020/0133783 A1 | 4/2020 | Kumar | |
| 2020/0192572 A1* | 6/2020 | Dwarampudi | G06F 3/064 |
| 2021/0117277 A1* | 4/2021 | Shetty | G06F 9/4881 |
| 2022/0019482 A1* | 1/2022 | Jiang | G06F 3/0631 |

\* cited by examiner

*Primary Examiner* — Jason W Blust
(74) *Attorney, Agent, or Firm* — Aaron Pontikos (57) ABSTRACT

An inventory of computer resources requiring backup data protection including an estimate of future growth of storage resources along with a set of data retention policies, rules, and outcomes in conformance with business requirements, is created. An architecture for initial ingest of protected data and a backup execution approach is created, based on the resource inventory, a sizing and assumptions of resources and data, and the set of data retention policies, rules, and outcomes. An initial ingest copies the protected data to the backup storage. The initial ingest architecture is transformed to a steady-state ingest phase, by incrementally adjusting the resources based on progress of the initial ingest. Responsive to completing the initial ingest of protected data, a steady-state backup ingest is performed. A validity of the sizing and assumptions of architecture resources is determined and an adjustment to the resources is performed based on the validity determination.

20 Claims, 3 Drawing Sheets

COMPREHENSIVE DATA PROTECTION BACKUP

FIELD OF THE INVENTION

The present invention relates to the protection of computer-based data and more specifically, to the creation of a comprehensive backup plan encompassing initial ingest and steady-state backup of data.

BACKGROUND OF THE INVENTION

Data protection applications often provide features to help backup administrators manage large-scale environments. Simplified policies, simplified scheduling, "intuitive user interfaces", integrated inventory, and user experiences are all examples of how data protection products provide capabilities to help manage large-scale environments. In addition, these products may also have collateral information in the form of best practices, white papers, reference architectures, etc. Some collateral information may include documentation and scripts to assist a backup administrator with a multitude of aspects of the large-scale environment, all of which need to be considered for data protection backup.

There is often available guidance documentation associated with data protection products that are intended to assist the creation and configuration of a data protection backup solution. The planning and creating of a proper data protection solution include a complicated set of disjointed activities to provide appropriate data protection and often require the use of multiple, unrelated tools and resources.

SUMMARY

According to an embodiment of the present invention, a method, computer program product, and system is disclosed. The embodiments include a computer-implemented method for a comprehensive backup solution, the computer-implemented method provides for one or more processors to create an inventory of resources associated with a computing environment requiring data protection by use of backups, including an estimate of future growth of the resources storing protected data. The one or more processors create a set of data retention policies, rules, and outcomes associated with the computing environment in conformance with predetermined business requirements. The one or more processors create an architecture for an initial ingest of protected data to backup storage, and an approach as to how the backups will be executed, based on the inventory of resources, a sizing and assumptions associated with determination of resources for the backup storage of the architecture, the set of data retention policies, the rules, and the outcomes associated with backup of the protected data. The one or more processors perform an initial ingest of the protected data to the backup storage of the architecture. The one or more processors transition the architecture from a phase of the initial ingest to a steady-state ingest phase by incrementally adjusting the resources based on progress made from the initial ingest towards the steady state. Responsive to completing the initial ingest of protected data, the one or more processors perform a steady-state backup ingest. The one or more processors determine a validity of the sizing and assumptions associated with the resources for the backup storage of the computing environment, and the one or more processors perform an adjustment to the resources of the computing environment based on the determination of the validity of the sizing and assumptions.

DETAILED DESCRIPTION

Embodiments of the present invention recognize that planning and creating a proper data protection architecture still presents a complicated set of disjointed activities for the backup administrator (i.e., administer of backup storage architecture, implementation, and operation) to consider, consume, and perform in order to provide appropriate data protection. The backup administrator faces a multitude of considerations in the development and implementation of a secure and robust backup solution for the protection of data, especially for large enterprise-scale environments. For example, such considerations may include: "what is the footprint that needs to be protected", "what data within the footprint needs protection", "what large-scale applications are included in protection activities", what are the data protection rules", "what are the business requirements", "how do the business requirements translate into data protection policies", "what is the nature of the data to be protected", "does the data to be protected change or grow over time", "does the data conform to data reduction techniques", "how will the initial ingest of protected data be performed", and "what are the changes needed to transition from the initial ingest to a steady-state protection of data?"

Embodiments of the present invention protect data of a large-scale environment in a consolidated workflow by providing a method, computer program product, and computer system for a comprehensive backup solution. A comprehensive backup solution includes consideration, planning, and performance of backup activities that include all environment and business requirement considerations the approach of initial ingest of data to be protected (also referred to herein as the "protected data"), and adjustment of resources as the initial ingest of protected data progresses towards a steady state of backup. In some embodiments, the comprehensive backup solution further includes determining the validity of estimates and assumptions made during backup solution planning and performing adjustments based on the determination. In some embodiments, additional assessment is performed to determine the impact of the backup solution on the large-scale computing environment.

In some embodiments, determination of an inventory of resources of the large-scale computing environment includes data storage resources hosting data to be protected, data storage resources to host the protected data in a backup, data movement engines to perform a transfer of data from a production storage resource to a backup storage resource during initial and steady-state ingest of protected data, and additional network and backup storage elements enabling the configuration for and performance of protected data backup. Embodiments of the present invention recognize that a backup of data includes copying and transmitting a selection of data from primary storage of the computing environment to secondary storage as protected data. The backup may include one or more copies of the protected data located locally, remotely, or both, and may be distributed on one or multiple storage devices.

Embodiments of the present invention create an inventory of resources and determine the data requiring data protection. The inventory includes physical and virtual machines, storage resources, and data movement resources (data movement "engines"), and selection of the data hosted on storage resources that require backup protection. The inventory and selection of protected data provide a front-end storage sizing and identification of resources containing data to include in a backup solution.

Embodiments create data protection policies based on receiving business requirements associated with the large-scale computing environment. The protection policies are based on rules of which data to protect, the frequency of performing a backup, the retention period of the backup, additional copies of the backup, and location of backup(s)

Embodiments of the present invention create an architecture (also referred to as a reference architecture) for an initial ingest of the protected data. The architecture is created based on the previous sizing, backup frequency, and retention information and includes receipt of initial values for anticipated data change rates and data reduction compatibility of the data for a predetermined forecast period. The architecture may include an initial ingest image and a steady-state image and an approach to perform the data ingest.

Embodiments perform an initial ingest of protected data that includes copying and transferring the identified data requiring backup solution protection from production level storage to backup storage resources of the architecture. The initial ingest of protected data may be performed in a bulk ingest of data or a graduated ingest of data. The bulk ingest performs a continual transfer of all the initial data from the production storage resources to the backup resources of the architecture until complete. The bulk ingest may significantly impact the production environment availability and performance of the large-scale computing environment, unless the sizing indicates that the full movement of data can be completed in 24-48 hours, such as over a weekend.

The graduated ingest utilizes a traditional steady-state backup window, often scheduled overnight in low transaction periods. The graduated ingest balances the usage of the traditional backup window such that the protected data are gradually introduced into the backup architecture storage resources over a period of time.

Embodiments of the present invention incrementally adjust the resources of the reference architecture during the initial ingest of protected data towards the architectural resources supporting the ongoing steady state backup ingest of protected data. The progress made during the initial ingest of protected data and the sizing and assumptions supporting the steady-state ingest of protected data serve as a basis for determining the incremental adjustments. In some embodiments, actual progress performance of the initial ingest may trigger automatically identifying computing resources to further enable and/or expedite the initial ingest. The computing resources identified may include, but are not limited to backup proxies, storage repositories, additional central processing units (cpu's), and memory. In some embodiments, the reference architecture may include the additional computing resources as "stand-by" and add the identified resources automatically to the initial ingest process.

Embodiments, subsequent to completion of the initial ingest of protected data, perform a steady-state backup ingest of protected data. The steady-state ingest includes only changes made from the time point of the initiation of the previous steady-state backup (or the time point of completion of the initial ingest of protected data).

Embodiments of the present invention perform adjustments to resources based on validating the initial sizing and assumptions. The adjustments are based on observations from the steady-state phase of backups that include unexpected/unanticipated events, including failure conditions, front-end or back-end growth patterns, data reduction performance, and performance issues, for example. In some embodiments, additional storage repository resources are identified with generation of the reference architecture and are automatically added to the storage during initial ingest and/or steady-state operations to expand capacity as required.

In some embodiments of the present invention, the backup solution resources, and performance of the front-end system, receive continual monitoring and assessment based on the predetermined frequency of polling system data. Threshold anomalies are determined from analysis of the data from the monitoring and assessment for use in determining patterns and providing alerts.

Some embodiments take into account required data transformations (e.g., data encryption in transit and at rest), and analysis may suggest data transformations, such as data compression, deduplication, or combinations thereof, in order to meet optimal storage requirements.

Figure 1:
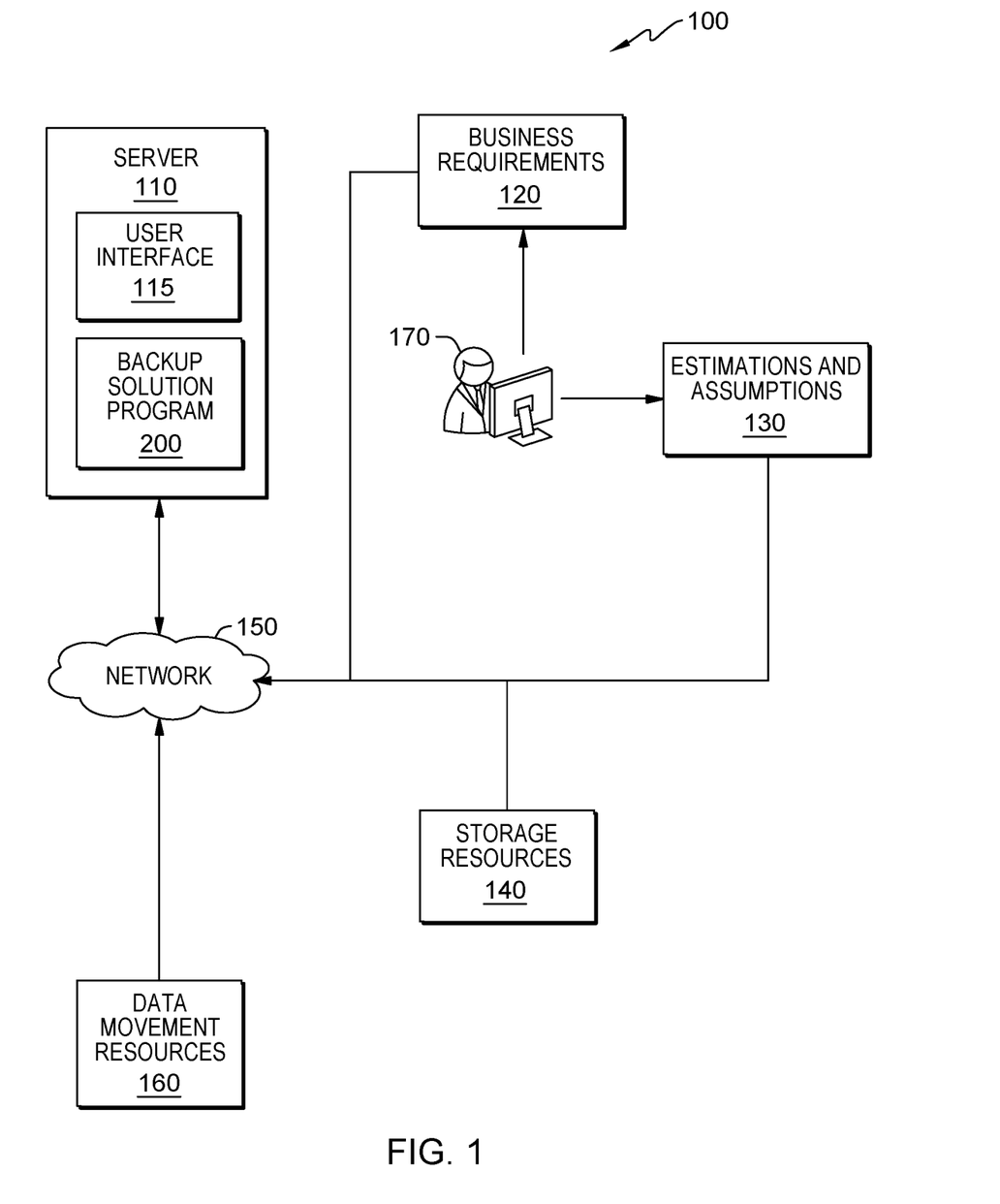
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. The terminology used herein was chosen to best explain the principles of the embodiments, the practical application or technical improvement over technologies found in the marketplace, or to enable others of ordinary skill in the art to understand the embodiments disclosed herein.

Server 110 is a computing device depicted as including user interface 115 and backup solution program 200. In some embodiments of the present invention, server 110 represents a virtual computing device operating based on multiple computers as a server system, such as in a cloud computing environment, and receives or accesses information from business requirements 120, estimates and assumptions 130, storage resources 140, and data movement resources 160, via network 150.

In some embodiments, server 110 can be a web server, a blade server, a desktop computer, a laptop computer, a tablet computer, a netbook computer, or any other programmable electronic computing device capable of receiving, sending, and processing data, and communicating with other entities within distributed data processing environment 100 via network 150. In another embodiment, server 110 represents a computing system utilizing clustered computers and components (e.g., database server computers, application server computers, etc.) that act as a single pool of seamless resources when accessed within distributed data processing environment 100. Server 110 may include internal and external hardware components, as depicted in more detail in FIG. 3.

User interface 115 provides an interface to access the features and functions of server 110. In some embodiments of the present invention, user interface 115 provides access to backup solution program 200, operating on server 110. User interface 115 may also support access to other applications, features, and functions of server 110 (not shown). In some embodiments, user interface 115 provides display output and input functions for server 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include application software that provides respective interfaces to features and functions of server 110. User interface 115 enables respective users of server 110 to receive, view, hear, and respond to input, access applications, display content of online conversational exchanges, and perform available functions.

Backup solution program 200 provides a computer-implemented process creating a comprehensive backup solution for the protection of data within a computing environment. In one embodiment of the present invention, backup solution program 200 creates an inventory of resources of the computing environment associated with the storage of data that requires backup protection. The inventory includes information regarding the sizing of the particular stored data to be protected, the type of data, and the conformance of the data to data-reduction techniques. The inventory additionally includes an estimate of the potential growth of resources storing the protected data.

Backup solution program 200 creates a data set that includes policies and rules, based on received input of business requirements. The rules are collected and defined and collectively organized into data protection policy decisions. The rules include frequency of data backup, recovery point objectives, retention period, the number of backup copies, the location of the backup copies, and type of storage resource storing the protected data, which are collectively organized into data protection policy decisions.

Backup solution program 200 creates an architecture for an initial ingest of protected data to backup storage and includes an approach to perform an initial ingest of the protected data. The sizing, inventory, and previous protection policies determine the reference architecture, which includes estimates and assumptions of predicted data storage needs. In some embodiments, backup solution program 200 includes the creation of an architecture plan for steady-state ingestion of protected data. Backup solution program 200 performs the initial ingestion of protected data to backup storage resources of the created architecture and, subsequent to completion of the initial ingestion, performs steady-state ingestion per the designated protection policies.

In some embodiments, backup solution program 200 performs an initial ingest of the protected data, copying the data to be protected to the backup storage resources of the architecture. The initial ingest of data to be protected can be performed as a bulk ingest of data or a graduated ingest of data, which have different time requirements to complete.

In some embodiments, backup solution program 200 incrementally transitions the architecture from the initial ingest state or phase towards the steady-state ingest condition or phase, based on the progress made during performance of the initial ingestion and architectural plans created for the steady-state condition. For example, fewer data movement engine resources may be needed in copying and transmitting protected data to backup storage resources as the initial ingest progresses. In some embodiments, actual progress performance of the initial ingest may trigger automatically identifying computing resources to further enable and/or expedite the initial ingest. The computing resources identified may include, but are not limited to backup proxies, storage repositories, additional central processing units (cpu's), and memory. In some embodiments, the reference architecture may include the additional computing resources as "stand-by" and add the identified resources automatically to the initial ingest process Backup solution program 200 determines the validity of the sizing and assumptions associated with the backup architecture created for the computing environment, based on observation (i.e., data monitoring) of unexpected events, data reduction performance, growth patterns of protected data, and unexpected performance issues, for example. Backup solution program 200 generates alerts in response to anomalies exceeding predetermined thresholds and provides monitoring (polling) of data from compute and storage system components, which are stored for analysis of patterns, and potentially for generating alerts to system administrators or automated responses. In some embodiments, additional storage repository resources are identified with generation of the reference architecture and are automatically added to the storage during initial ingest and/or steady-state operations to expand capacity as required.

Business requirements 120 include input from business-based users, such as user 170 in a backup system developer/administrator role. Business requirements 120 include identification of data requiring backup protection and identification of production storage resources storing the data. Business requirements 120 include the frequency of backups by identified data and storage resource, the retention period of backups, which may include multiple backups with different frequency and retention periods, and recovery point objectives. Business requirements 120 also include information about the location of backup storage, including local and remote locations, as well as the kind of storage resources and the need for physical or logical presentation of storage.

Estimates and assumptions 130 include the input of front-end storage resource sizing of the inventory and an estimate of future changes to backup storage as a rate or sizing per unit of time. An initial sizing of storage that includes anticipated or predicted linear growth and change over time can be considered in estimates and assumptions 130. In some embodiments, estimates, and assumptions 130 include predictions for non-linear growth, such as combining IT departments or company mergers. Estimates and assumption 130 also include assumptions of data reduction performance such as from deduplication or data compression techniques for different data sets designated for protection and resource failure rate estimates. In some embodiments, existing estimates or extrapolation of previous and current system data for the computing environment serve as an information basis for estimates and assumptions 130.

Storage resources 140 include the physical and logical resources that include the current production data and the storage resources on which the protected data will be stored. In some embodiments, the quantity, size, and type of protected data storage resources are determined based on an initial sizing of the inventory of resources storing production data and selection of the production data and associated to be protected. Storage resources 140 include virtual machines, host servers, databases, server clusters, and data centers associated with data to be protected. Storage resources 140 also include an estimate or extrapolation of the potential growth rate of data to be protected, often based on monitored trends of data processing. In some embodiments, storage resources 140 include resources that host and/or operate large-scale applications, such as database and data organization applications. Storage resources 140 include a front-end physical and logical inventory or storage resources and required backup storage resources based on the protection policies and rules associated with the identified data to be protected.

Data movement resources 160 include a collection of computing devices, referred to herein as "data movement engines," which perform the copy and transfer of data from front-end storage resources to the created architecture for backup storage. In some embodiments, data movement resources 160 include information associated with the locality of the data movement engines to meet the particular transfer rate and volume associated with the planned approach for the initial ingest of data and subsequent steady-state ingest of data. The basis for determining the number of data movement engines of data movement resources 160 includes the volume and type of data to be protected, the number of physical locations of storage resources, the locality of the data movement engines, and the timeframe approach for the initial ingest and steady-state ingest of protected data. In some embodiments, reduction of the number of data movement engines occurs based on the progression of the initial ingest of data.

User 170 is an administrator developing a backup solution architecture and operational process and overseeing the performance of the initial ingest and steady-state ingest of protected data transferred to the backup storage resources. In some embodiments, user 170 provides information and values as input to business requirements 120 and estimates and assumptions 130.

Figure 2:
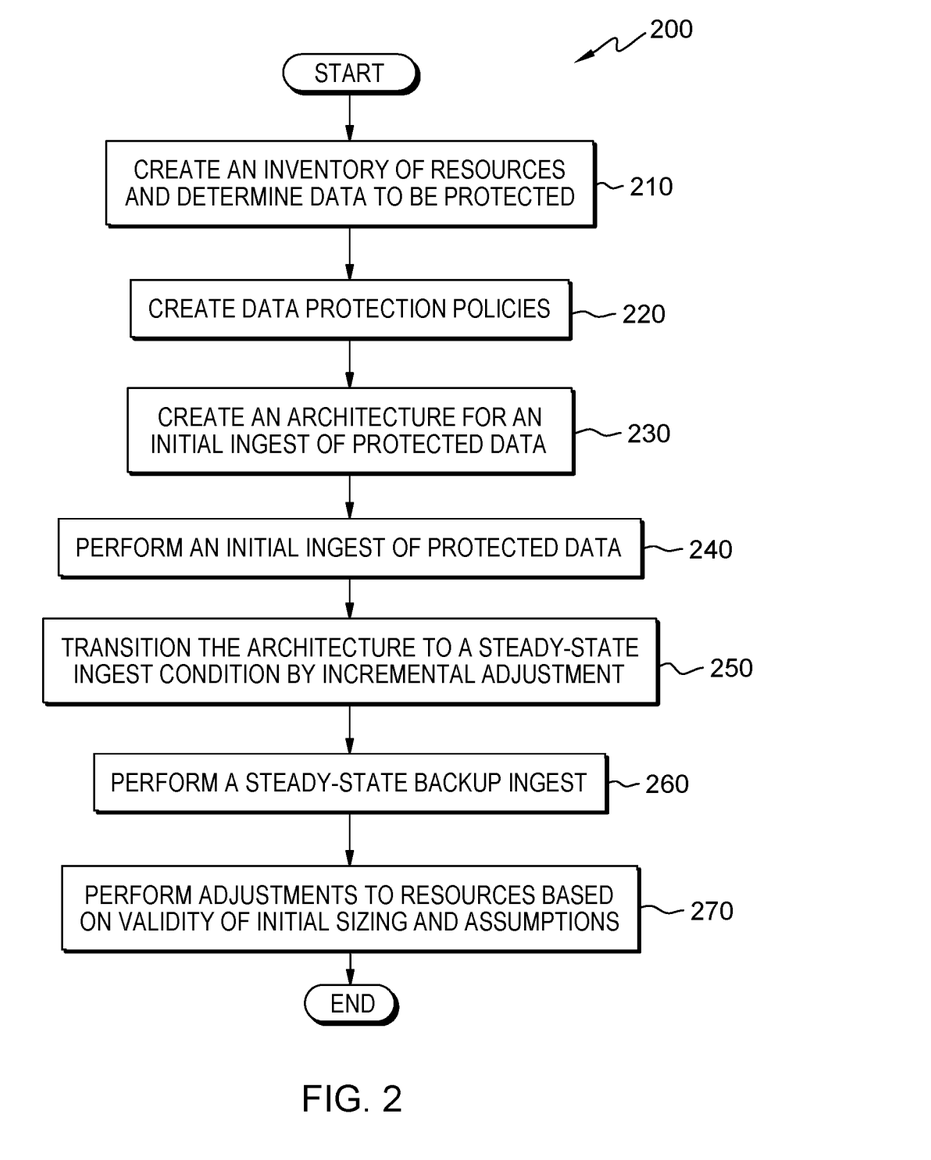
FIG. 2 is a flowchart depicting operational steps of a backup solution program, operating in the distributed data processing environment of FIG. 1, in accordance with embodiments of the present invention.

FIG. 2 is a flowchart depicting operational steps of backup solution program 200, operating in distributed data processing environment 100 of FIG. 1, in accordance with embodiments of the present invention. Backup solution program 200 provides protection of data of a large-scale computing environment in a consolidated workflow for a comprehensive data backup solution. A comprehensive backup solution includes consideration, planning, and performance of backup activities that include environmental and business requirements, the approach of initial ingest of data to be protected (also referred to herein as the "protected data"), and adjustment or resources as the initial ingest of protected data progresses towards a steady-state phase of performing backups.

Backup solution program 200 creates an inventory of resources and determines the data to be protected (step 210). Backup solution program 200 identifies the physical and logical resources within the large-scale computing environment, including virtual machines, host servers, host clusters, data centers, database instances, etc. Backup solution program 200 determines the data type stored on respective resources and creates an inventory of the resources and data type stored on the resources. Backup solution program 200 receives input identifying the data on respective resources to be protected. The result includes a set of storage resources of the inventory and the data stored on the set of storage resources that require protection. In some embodiments, the selection of data to be protected is done by applying rules designating "protect" or "don't protect" for data of a particular resource.

For example, backup solution program 200 identifies the storage resources of a large-scale computing environment and creates an inventory of storage resources as well as the data type stored on the respective resources. Backup solution program 200 receives input indicating the data to be protected and not protected for the respective resources. The inventory created along with the identification of the protected data (i.e., data to be protected) provides a sizing of protected data on which a backup architecture is based. The sizing and designation of protection rules combine historically separate steps into a single activity and include an estimate of growth potential, which can be based on the monitoring of data rate of change.

Backup solution program 200 creates data protection policies (step 220). Backup solution program 200 creates a data set that includes policies and rules, which are determined at least in part by the input received that includes business requirements. Data protection policy decisions are organized from the collection and definition of rules that include frequency of data backup, recovery time, recovery point objectives, retention period, the number of backup copies, the location of the backup copies, and the type of storage on which the protected data is stored.

For example, backup solution program 200 receives business requirements from user 170 that indicates backup protection for all virtual machines on a daily basis with a retention period of 30 days, and an additional copy of the data sent to a remote location with the same frequency and retention. Additionally, a selection of certain server hosts receive backup on a daily basis and are retained for 30 days with an additional monthly backup retained for 3 years. Resources are to support a recovery time of 8 hours or less with a recovery point objective of 24 hours. Business requirements provide the basis for generating rules and policies, such as rules that identify front-end resources storing data that require backup protection, the resources with data that will not be backed up, and the details associated with the respective resource backups.

For example, virtual machines 1, 2, 3, and 5, host 2, host cluster A, and datacenter 2 will receive backup under a policy that utilizes local backup resources for steady-state daily backups during off-peak hours, retained for 1 month, and cloud services of two separate physical locations for monthly backups retained for 3 years. The policy includes use of adequate resources to perform a recovery from local backups within 8 hours and recovery within 24 hours from cloud storage backups. Each storage set of data includes use of redundancy array of independent disks (RAID) for disk storage resources.

Backup solution program 200 creates an architecture for an initial ingest and a steady-state ingest of protected data (step 230). Backup solution program 200 determines the data movement engines and the storage resources required for the initial ingest of the protected data identified from the front-end storage sizing. Backup solution program 200 determines resource type and capacity based on the inventory sizing information of the data to be protected, combining data indicated as similar data type, retention requirements, and response to data reduction techniques, such as deduplication and data compression. The initial reference architecture is based on the sizing and assumptions associated with determination of resources for the backup storage, and the set of data retention policies, rules, and outcomes associated with backup of the protected data.

Backup solution program 200 determines the data movement engine sizing based on the initial ingestion approach decision, which may be a bulk ingestion of the complete transfer of protected data to the backup storage resources or may be a graduated ingest utilizing portions of existing steady-state backup windows. The data movement engine requirements also depend on an expected completion timeframe of the initial ingest. A graduated ingest gradually introduces the protected data to the backup storage resources, taking significantly longer than the bulk ingest approach but allows reduced impact to production systems during non-steady-state backup periods.

In some embodiments, during the creation of the architecture, backup solution program 200 varies and adjusts components of the planned architecture and data transfer attributes to accommodate the business requirements and schedule, and determine an optimal architectural plan, sometimes referred to as a reference architecture, for initial ingest of the protected data. In some embodiments, backup solution program 200 determines a steady-state architecture for continual operational backup subsequent to the initial protected data ingest and determines adjustments to architectural resources for transition from the initial ingest activity to steady-state backup operations. Backup solution program 200 includes in the reference architecture, a mapping of the backup storage resources in which the front-end data will be stored. In some embodiments, machine learning techniques, based on pre-set rules applied to the collected inventory data determines the storage resources for backup of respective front-end data. In some embodiments, backup solution program 200 receives confirmation information of the implemented (i.e., final target) architecture which may be adjusted from the reference architecture based on final backup storage resource requirements.

The output from this step also includes a plan to execute the and, in some embodiments, includes the number and size of backup storage elements, the number of data movement engines, the locality of data movement engines, the execution schedule, ingest execution priority and resource priority, transition to a steady-state backup phase, how a modification to resources and policies affects required storage and ingest completion.

For example, backup solution program 200 receives protection policies derived from business requirements 120, inventory sizing of storage resources 140, and input from estimates and assumptions 130, received to create a reference architecture for initial ingest of the protected data and ongoing steady-state backup operations. Backup solution program 200 bases the reference architecture on the storage inventory sizing including data type and conformance to data reduction techniques and determines the physical and logical resources to meet the protection policy attributes of backup frequency, retention, response time, recovery point objective, and data reduction. Backup solution program 200 includes determining adjustments to the reference architecture for the initial ingest to transition to a steady-state operational architecture.

Backup solution program 200 performs the initial ingest of protected data (step 240). Backup solution program 200 receives confirmation for initial ingest based on the created reference architecture and receives a confirmation to begin initial ingestion of the protected data to the backup storage resources. Backup solution program 200 performs a backup operation by copying data designated for protection from the front-end production system of the computing environment and transmits the copied data to backup storage resources as designated in the reference architecture and backup execution approach. Backup solution program 200 receives input defining the approach of the initial ingest, including whether the approach is a bulk ingest approach or a graduated ingest approach, and conditions and constraints associated with the initial ingest of protected data, such as data movement time windows.

A bulk ingest model continually works through the entire initial ingest taking the time needed to complete the ingest of protected data. For example, smaller workloads might require 36-48 hours that could be performed in "bulk" over a weekend. A graduated ingest can use a traditional steady-state backup window (for example, 8-10 hours per night) and balance the backup window over time so that the initial backup introduction occurs gradually into the backup storage resources. This would take much longer than the bulk ingest method as the amount of time dedicated to the initial ingest reduced and spread over time, but this would allow the user to adhere to a traditional backup window and not negatively affect production systems during peak hours.

For example, In the case of a graduated ingest, there would be some basic inputs needed from the customer, such as the number of hours for the backup window, the number of days allowed for the full backup balanced against the length of the backup window, priorities for backup time to initial ingest or dedicate prioritized backup time to the steady-state ingest of the inventory that has already been ingested into backup storage. Additional priorities can be offered, such as prioritization of workload by use of a tagging system to set prioritization on individual virtual machines, hosts, host clusters, etc. Backup solution program 200 performs data movement of the protected data to respective backup storage resources (i.e., initial ingest) per the selected approach and conditions, utilizing the data movement engine resources.

Backup solution program 200 transitions the architecture to a steady-state ingest condition by incremental adjustments (step 250). Backup solution program 200 determines the progress of data movement engines towards the completion of the initial ingest of protected data to the backup storage resources. As the initial ingest phase proceeds toward completion, the level of progress (i.e., percentage completion) is determined, and backup solution program 200 performs adjustments to the resources of the initial ingest architecture based on the progress towards completion of the initial ingest and a beginning of a steady-state phase. For example, in a bulk initial ingest method, backup solution program 200 determines that the initial ingest data movement engine resources sized in number to optimize throughput are not all needed as the ingest proceeds. Reduction of the initial number of data movement engines occurs as the initial ingest proceeds towards completion.

Adjustments to initial ingest resources include an incremental approach that continuously re-calculates the number of resources needed for an initial ingest and compares this to the current number of resources allocated. For example, on day 0, backup solution program 200 calculates that 10 data movement engines are needed for the workload based on a bulk initial ingest approach. On day 1, a recalculation of the number of data movement engines needed for the remainder of the initial ingest is performed, considering resources needed for the new steady-state workload of resources that have already moved through the initial ingest. An outcome based on the day 1 re-calculation may indicate the need now for only 9 data movement engine resources, indicating that a data movement engine can be removed (i.e., either disabled or uninstalled).

The outcome of this step is an ongoing incremental adjustment in the management of resources being used on a daily basis towards the transition from the initial ingest state into a steady-state backup phase, which optimizes the completion of the backup initiation process with the economy of resource usage.

Backup solution program 200 performs a steady-state backup ingest (step 260). Backup solution program 200 determines the completion of the initial ingest of protected data and the incremental adjustments made during the progress of the initial ingest architecture towards a set of resources to support a steady-state ingest of protected data.

For example, backup solution program 200 determines the completion of the initial ingest of protected data to backup storage resources and determines the number of data movement engines needed to support a steady-state backup ingestion, disabling, or initiating the removal of unneeded resources. Backup solution program 200 initiates and performs a steady-state ingest, based on the previously determined protection policies and storage resources.

Backup solution program 200 performs adjustments to resources based on the validity of initial sizing and assumptions (step 270). Backup solution program 200 performs observation (i.e., monitoring) of the backup solution system components and performance indicators of front-end production transactions. The monitoring activity generates data associated with the backup solution based on the initial sizing and assumptions. In some embodiments, the observations are performed on a pre-determined frequency and include recording of observations following the performance of a regular steady-state backup. Data from observations can include estimating an approximate change rate by determining an amount of data sent incrementally for each resource of the storage resources, determining a duration of time to perform the steady-state backup, identifying a number of resources that failed performing the steady-state backup, and determining whether an assumed data reduction rate is achieved.

Analysis of the monitored data determines the validity of the initial sizing of backup storage resources and assumptions, which include the projected change rate of the protected data, duration of performing the steady-state backup, backup failures, error conditions, and unexpected events. Analysis of the stored monitoring data includes determining patterns and anomalies by comparison of monitored results to a set of expected results (e.g., determined during the creation of reference architecture), and determining whether monitored conditions exceed expected results by a predetermined threshold.

In response to determining that monitored conditions exceed a threshold of expected results, backup solution program 200 generates an alert of the anomalies and in some embodiments, includes actions such as adjusting the sizing of the data movement engines or backup storage resources by adding or removing a resource. In some embodiments, the adjustments include user input of authorization and location information for resource adjustment.

Additionally, backup solution program 200 extrapolates data changes over time, recalculating protected data sizing, growth rate, failure rate, evaluating the sufficiency of the initial sizing. In some embodiments, backup solution program 200 continuously polls data from computing and storage system components and provides alerts of pending critical conditions of the system. The front-end and back-end data monitored may include a central processing unit (CPU) usage by component, memory usage overall and by component, storage usage overall, and by component and input/output (I/O) statistics. Backup solution program 200 creates alerts to users (customer administrators) regarding anomalies exceeding predetermined "expected" thresholds.

Figure 3:
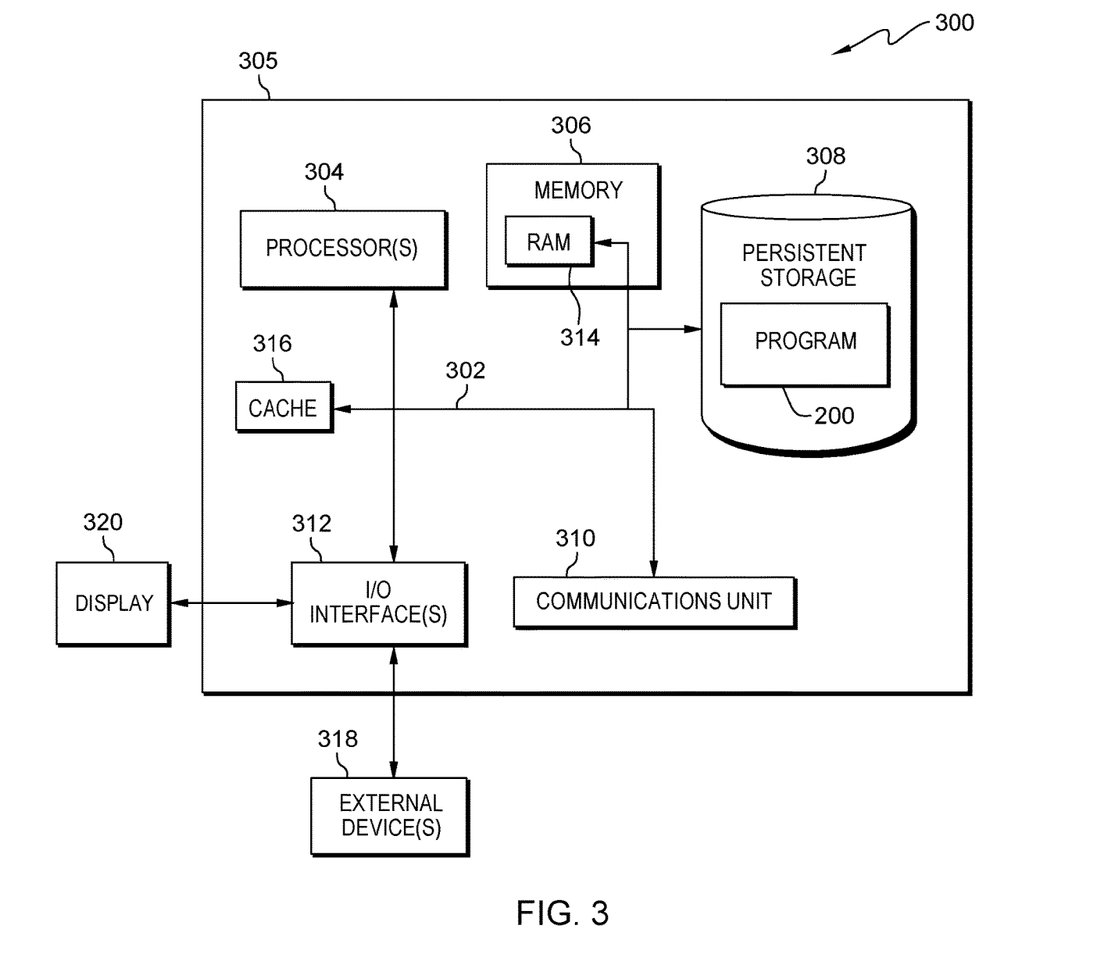
FIG. 3 depicts a block diagram of components of a computing system, including a computing device configured with the capability to operationally perform the backup solution program of FIG. 2, in accordance with an embodiment of the present invention.

FIG. 3 depicts a block diagram of components of computing system 300, including computing device 305 configured to include or operationally connect to components depicted in FIG. 1, and with the capability to operationally perform the backup solution program 200 of FIG. 2, in accordance with an embodiment of the present invention.

Computing device 305 includes components and functional capability similar to components of server 110, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, backup solution program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Backup solution program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., backup solution program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for a comprehensive backup solution, the computer-implemented method comprising:
   creating, by one or more processors, an inventory of resources associated with a computing environment requiring data protection by performing a backup operation including an estimate of future growth of the resources storing protected data;
   creating, by one or more processors, a set of data retention policies, rules, and outcomes associated with the computing environment in conformance with predetermined business requirements;
   creating, by one or more processors, an architecture for an initial ingest of protected data to backup storage, and an approach as to how the backup operation will be executed, based on the inventory of resources, a sizing and assumptions associated with determination of resources for the backup storage, and the set of data retention policies, the rules, and the outcomes associated with backup of the protected data;
   performing, by one or more processors, an initial ingest of the protected data to the backup storage;
   transitioning, by one or more processors, the architecture from a phase of the initial ingest to phase of a steady-state ingest, by incrementally adjusting the resources based on progress made from the initial ingest towards the steady-state;
   responsive to completing the initial ingest of protected data, performing, by one or more processors, a steady-state backup ingest;
   determining, by one or more processors, a validity of the sizing and assumptions associated with the resources for the backup storage; and
   performing, by one or more processors, an adjustment to the resources of the computing environment based on the determination of the validity of the sizing and assumptions.

2. The method of claim 1, further comprising:
   adjusting, by one or more processors, the computing environment commensurate with occurrence of unexpected events, including failures and unexpected growth patterns.

3. The method of claim 1, further comprising:
   assessing, by one or more processors, an impact to the computing environment by monitoring utilization information of the computing environment including input/output rates, central processor usage rates, and storage usage to create assessment data; and
   storing, by one or more processors, the assessment data in a repository for pattern analysis.

4. The method of claim 3, further comprising:
   generating, by one or more processors, alerts using the assessment data with predetermined tools in response to a determination compute and storage system resources usage is outside a predetermined range.

5. The method of claim 1, wherein validation of the sizing or resources and assumptions received are continually performed on a predetermined interval.

6. The method of claim 1, wherein creating an architecture for the initial ingest of protected data to the backup storage includes determining an execution priority during the phase of the initial ingest and the execution priority during the steady-state phase.

7. The method of claim 1, wherein determining a validity of the sizing and assumptions associated with the resources for backup storage, further comprises:
   performing, by one or more processors, observations of steady-state backup on a pre-determined frequency, wherein the observations include:
      an approximate change rate by determining an amount of data sent incrementally for each resource of the storage resources;
      a duration of time to perform the steady-state backup;
      a number of resources that failed performing the steady-state backup; and
      a data reduction rate achieved.

8. A computer program product for a comprehensive backup solution, the computer program product comprising:
   one or more computer readable storage media and program instructions stored on the one or more computer readable storage media, the program instructions comprising:
      program instructions to create an inventory of resources associated with a computing environment requiring data protection by performing a backup operation including an estimate of future growth of the resources storing protected data;
      program instructions to create a set of data retention policies, rules, and outcomes associated with the computing environment in conformance with predetermined business requirements;
      program instructions to create an architecture for an initial ingest of protected data to backup storage, and an approach as to how the backup operation will be executed, based on the inventory of resources, a sizing and assumptions associated with determination of resources for the backup storage, and the set of data retention policies, the rules, and the outcomes associated with backup of the protected data;
      program instructions to perform an initial ingest of the protected data to the backup storage;
      program instructions to transition the architecture from a phase of the initial ingest to phase of a steady-state ingest, by incrementally adjusting the resources based on progress made from the initial ingest towards the steady-state;
      responsive to completing the initial ingest of protected data, program instructions to perform a steady-state backup ingest;
      program instructions to determine a validity of the sizing and assumptions associated with the resources for the backup storage; and
      program instructions to perform an adjustment to the resources of the computing environment based on the determination of the validity of the sizing and assumptions.

9. The computer program product of claim 8, further comprising:
program instructions to adjust the computing environment commensurate with occurrence of unexpected events, including failures and unexpected growth patterns.

10. The computer program product of claim 8, further comprising:
program instructions to assess an impact to the computing environment by monitoring utilization information of the computing environment including input/output rates, central processor usage rates, and storage usage to create assessment data; and
program instructions to store the assessment data in a repository for pattern analysis.

11. The computer program product of claim 8, further comprising:
program instructions to generate alerts using the assessment data with predetermined tools in response to a determination compute and storage system resources usage is outside a predetermined range.

12. The computer program product of claim 8, wherein program instructions to validate the sizing or resources and assumptions received are continually performed on a predetermined interval.

13. The computer program product of claim 8, wherein program instructions to create an architecture for the initial ingest of protected data to the backup storage includes determining an execution priority during the phase of the initial ingest and the execution priority during the steady-state phase.

14. The computer program product of claim 8, wherein program instructions to determine a validity of the sizing and assumptions associated with the resources for backup storage, further comprises:
program instructions to perform observations of steady-state backup on a pre-determined frequency, wherein the observations include:
an approximate change rate by determining an amount of data sent incrementally for each resource of the storage resources;
a duration of time to perform the steady-state backup;
a number of resources that failed performing the steady-state backup; and
a data reduction rate achieved.

15. A computer system for a comprehensive backup solution, the computer program product comprising:
one or more computer processors;
one or more computer readable storage media, and program instructions stored on the one or more computer readable storage media for execution by at least one of the one or more computer processors, the program instructions comprising:
program instructions to create an inventory of resources associated with a computing environment requiring data protection by performing a backup operation including an estimate of future growth of the resources storing protected data;
program instructions to create a set of data retention policies, rules, and outcomes associated with the computing environment in conformance with predetermined business requirements;
program instructions to create an architecture for an initial ingest of protected data to backup storage, and an approach as to how the backup operation will be executed, based on the inventory of resources, a sizing and assumptions associated with determination of resources for the backup storage, and the set of data retention policies, the rules, and the outcomes associated with backup of the protected data;
program instructions to perform an initial ingest of the protected data to the backup storage;
program instructions to transition the architecture from a phase of the initial ingest to phase of a steady-state ingest, by incrementally adjusting the resources based on progress made from the initial ingest towards the steady-state;
responsive to completing the initial ingest of protected data, program instructions to perform a steady-state backup ingest;
program instructions to determine a validity of the sizing and assumptions associated with the resources for the backup storage; and
program instructions to perform an adjustment to the resources of the computing environment based on the determination of the validity of the sizing and assumptions.

16. The computer system of claim 15, further comprising:
program instructions to adjust the computing environment commensurate with occurrence of unexpected events, including failures and unexpected growth patterns.

17. The computer system of claim 15, further comprising:
program instructions to assess an impact to the computing environment by monitoring utilization information of the computing environment including input/output rates, central processor usage rates, and storage usage to create assessment data; and
program instructions to store the assessment data in a repository for pattern analysis.

18. The computer system of claim 15, wherein program instructions to validate the sizing of resources and assumptions received are continually performed on a predetermined interval.

19. The computer system of claim 15, wherein program instructions to create an architecture for the initial ingest of protected data to the backup storage includes determining an execution priority during the phase of the initial ingest and the execution priority during the steady-state phase.

20. The computer system of claim 15, wherein program instructions to determine a validity of the sizing and assumptions associated with the resources for backup storage, further comprises:
program instructions to perform observations of steady-state backup on a pre-determined frequency, wherein the observations include:
an approximate change rate by determining an amount of data sent incrementally for each resource of the storage resources;
a duration of time to perform the steady-state backup;
a number of resources that failed performing the steady-state backup; and
a data reduction rate achieved.

* * * * *